Patented May 12, 1931

1,804,466

UNITED STATES PATENT OFFICE

WILLIAM J. HALE, OF MIDLAND, MICHIGAN, ASSIGNOR TO THE DOW CHEMICAL COMPANY, OF MIDLAND, MICHIGAN, A CORPORATION OF MICHIGAN

PROCESS OF MAKING DIARYLAMINES

No Drawing.   Application filed August 23, 1926.   Serial No. 132,322.

This invention relates to the making of diarylamines, and more particularly the making of diphenylamine, and it is among the objects of the invention to provide improved procedure leading to more efficient yields of these compounds.

In the patent application of W. J. Hale and J. W. Britton, Serial No. 7133, filed Feb. 5, 1925, (Patent No. 1,607,824, Nov. 23, 1926, reissued as No. 17,280, Apr. 23, 1929), there was set forth a process of making aniline from chlorobenzene and the like by reaction with ammonia in the presence of certain catalytic agents. I have now found that with the use of similar catalytic agents and suitable procedure it is possible to direct the reaction course to the production of diaryl-derivatives. More especially in order that this may be best effected, it is necessary to keep down the concentration of ammonia as compared with the requirements for the production of aniline, for instance; also the temperature range advisable is higher by comparison.

This reaction, as indicated, is carried on in the presence of what may be generically designated as a copper accelerant. This includes a copper catalyst, as it may be called, and preferably therewith a promotor. As catalyst there may be employed cuprous oxide, or better, cuprous oxide containing a component of more reduced character, such as sub-cuprous oxide, or at least a copper compound in such state as to be readily reducible. As promotor, metallic copper is used.

As an illustrative example of the procedure involved in carrying out my improved process, the following may be noted:—

An iron autoclave is supplied with chlorobenzene and aqueous ammonia corresponding to about 1 and ½ moles of $NH_3$ to one mole of the chlorobenzene, and into this is introduced the accelerant comprising cuprous oxide containing sub-cuprous oxide, the total amount of the accelerant being about 0.1 to 0.2 mole. The autoclave will advisably also contain exposed copper in the form of strips, for instance, and the temperature is raised to between 175° and 250° C. and maintained for about 8 to 10 hours. At the end of the reaction, the products are drawn off and the aqueous layer treated with caustic soda, and the precipitated cuprous and sub-cuprous oxides are washed and returned to the system. The diphenylamine and aniline layer is worked up separately, and these products then may be appropriately purified.

The proportion of ammonia in general will not exceed three moles to one mole of the halogenated aromatic hydrocarbon.

As a means to further reduce the concentration of ammonia necessary to the formation of a diarylamine it is recommended to introduce during the course of the reaction a proportioned quantity of caustic alkali to displace the greater portion of ammonia from the $NH_4Cl$ produced as a by-product of the main reaction. This procedure will make possible the maintenance of higher alkalinity throughout the duration of the operation and will reduce considerably the corrosive action upon the walls of the vessel by ammonium chloride formed in the reaction. With the maximum supply of NaOH the proportion of $NH_3$ may theoretically be reduced as low as ½ mole per mole of chlorobenzene.

Dinaphthylamines, either alpha or beta, may be similarly made, starting with alpha-chlor or beta-chlor naphthalene. On analogous lines, halogenated toluene also may be employed as starting material to yield ditolylamine.

Other modes of applying the principle of the invention may be employed, change being made as regards the details herein disclosed, provided the step or steps stated by any of the following claims or the equivalent of such be employed.

I therefore particularly point out and distinctly claim as my invention:—

1. A process of making diarylamines, which comprises reacting between a nuclear mono-halogenated aromatic compound and ammonia in proportion not exceeding three moles of the latter to one of the former, in the presence of a copper compound as catalyst.

2. A process of making diarylamines, which comprises reacting between a nuclear mono-halogenated aromatic compound and ammonia in proportion of about one and one-half moles of the latter to one of the former, in the presence of a copper compound as catalyst.

3. A process of making diarylamines which comprises reacting between a nuclear mono-halogenated aromatic compound and ammonia in proportion not exceeding three moles of the latter to one of the former, in the presence of an accelerant including a copper catalyst and metallic copper.

4. A process of making diarylamines, which comprises reacting between a nuclear mono-halogenated aromatic compound and ammonia in proportion of about one and one-half moles of the latter to one mole of the former, in the presence of an accelerant including a copper catalyst and metallic copper.

5. A process of making diarylamines, which comprises reacting between a mono-halogenated aromatic compound and ammonia in proportion not exceeding three moles of the latter to one of the former, in the presence of an accelerant including cuprous oxide and a copper compound in which the copper is in a further reduced state, and metallic copper.

6. A process of making diarylamines, which comprises reacting between a mono-halogenated aromatic compound and ammonia in proportion of about one and one-half moles of the latter to one of the former, in the presence of an accelerant including cuprous oxide and a copper compound in which the copper is in a further reduced state, and metallic copper.

7. A process of making diphenylamine, which comprises reacting between chlorobenzene and aqueous ammonia in proportions not exceeding 2 moles of the latter to 1 of the former, in the presence of an accelerant including a copper catalyst and metallic copper.

8. A process of making diphenylamine, which comprises reacting between chlorobenzene and aqueous ammonia in proportions of about 1 and ½ moles of the latter to 1 of the former, in the presence of an accelerant including a copper catalyst and metallic copper.

9. A process of making diarylamines, which comprises reacting between a nuclear mono-halogenated aromatic compound and ammonia in proportion not exceeding three molecules of the latter to one of the former, in the presence of an accelerant including copper, and continuing the reaction after the addition of an alkali.

10. A process of making diarylamines, which comprises reacting between a nuclear mono-halogenated aromatic compound and ammonia in proportion not exceeding three molecules of the latter to one of the former, in the presence of an accelerant including a copper catalyst and metallic copper, and continuing the reaction after the addition of an alkali.

11. A process of making diarylamines, which comprises reacting between a nuclear mono-halogenated aromatic compound and ammonia in proportion not exceeding three moles of the latter to one of the former, in the presence of an accelerant including cuprous oxide and a copper compound in which the copper is in a further reduced state, and metallic copper, and continuing the reaction after the addition of an alkali.

12. A process of making diphenylamine, which comprises reacting between chlorobenzene and aqueous ammonia in proportion not exceeding two moles of the latter to one of the former, in the presence of an accelerant including a copper catalyst and metallic copper, and continuing the reaction after the addition of an alkali.

13. A process of making diarylamines, which comprises reacting between a nuclear mono-halogenated aromatic compound and ammonia in proportion not exceeding three moles of the latter to one of the former, in the presence of a cuprous compound.

14. A process of making diarylamines, which comprises reacting between a nuclear mono-halogenated aromatic compound and ammonia in proportion not exceeding three moles of the latter to one of the former, in the presence of cuprous oxide.

Signed by me this 20th day of August, 1926.

WILLIAM J. HALE.